United States Patent [19]

Hamilton

[11] Patent Number: 4,702,340

[45] Date of Patent: Oct. 27, 1987

[54] MOTORCYCLE APPARATUS

[75] Inventor: Mark Hamilton, Keene, N.H.

[73] Assignee: Rokon International, Inc., Jaffrey, N.H.

[21] Appl. No.: 875,332

[22] Filed: Jun. 17, 1986

Related U.S. Application Data

[63] Continuation of Ser. No. 774,059, Sep. 9, 1985, abandoned, which is a continuation of Ser. No. 552,744, Nov. 17, 1983, abandoned.

[51] Int. Cl.$^4$ ............................................. B62M 7/02
[52] U.S. Cl. ................................... 180/224; 180/219; 280/270
[58] Field of Search ............... 180/224, 223, 219, 255; 280/240, 270

[56] References Cited

U.S. PATENT DOCUMENTS 3,268,025  8/1966  Fehn ..................................... 180/224
3,298,486  1/1967  Perryman ........................... 192/41 S Primary Examiner—David M. Mitchell
Assistant Examiner—Donn McGiehan
Attorney, Agent, or Firm—Wolf, Greenfield & Sacks

[57] ABSTRACT

A motorcycle apparatus having improved features relating to an improved overall drive system for providing automatic transmission operation. Also described is an improved transmission construction relating to a gear selection means. Furthermore, there is described an improved spring (one-way) clutch having a pair of members secured to a drive shaft for the front wheel and the transmission output shaft, respectively, along with a clutch spring disposed about the members and a novel means for interlocking the members but enabling rotation therebetween.

2 Claims, 6 Drawing Figures

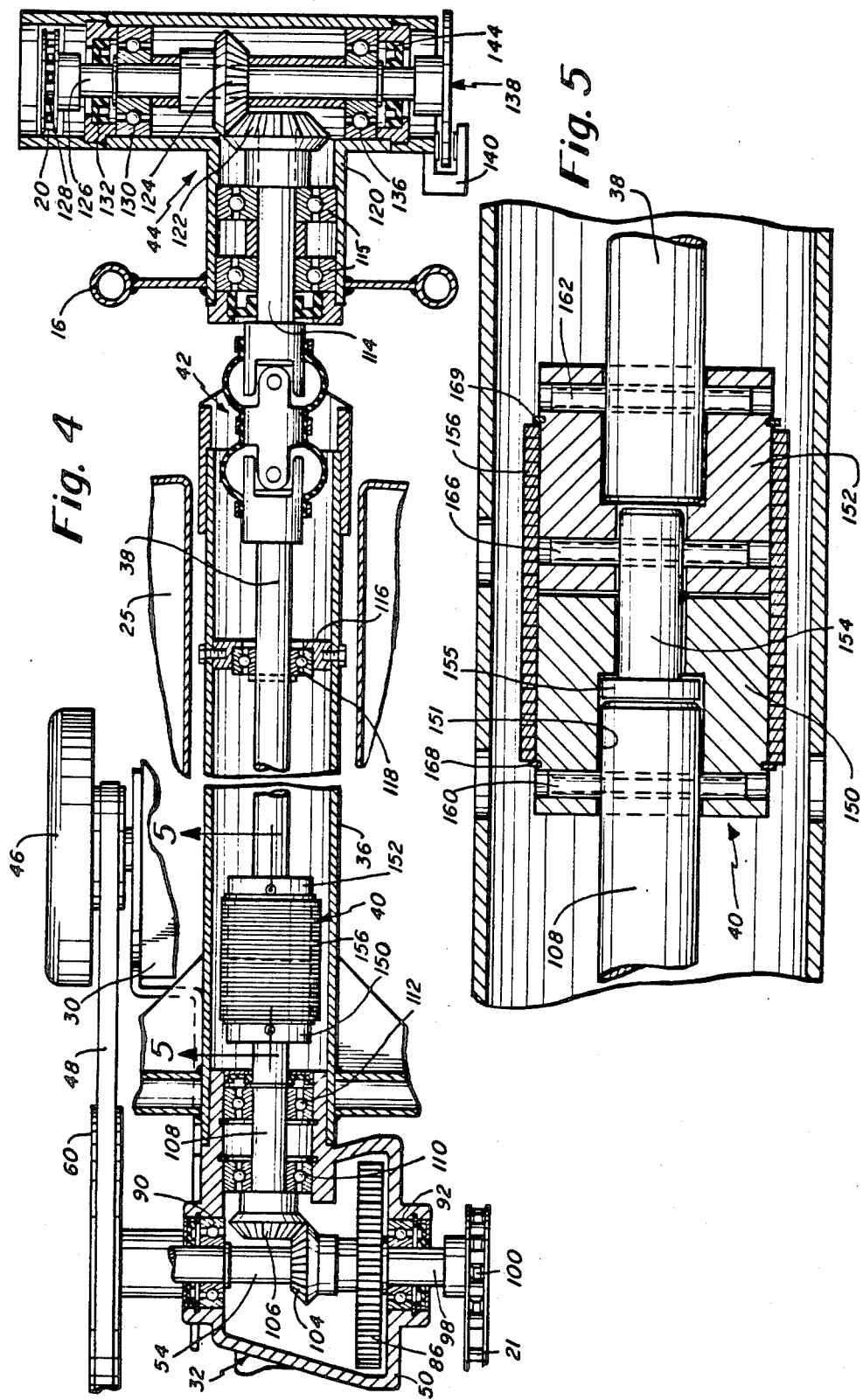

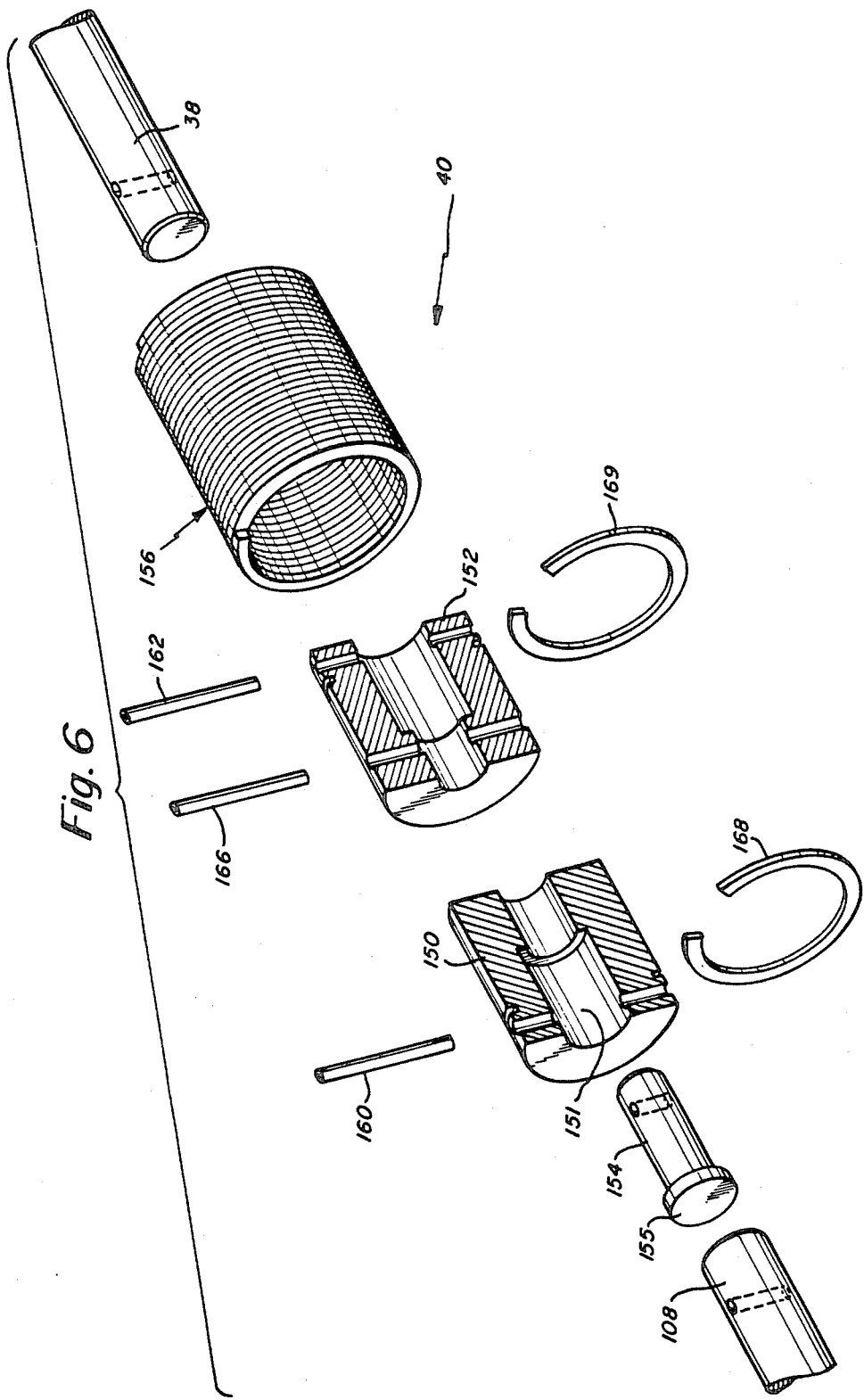

MOTORCYCLE APPARATUS

This application is a continuation, of application Ser. No. 774,059, filed Sept. 9, 1985 now abandoned which in turn is a continuation of application Ser. No. 552,744 filed on Nov. 17, 1983 now abandoned.

BACKGROUND OF THE INVENTION

The present invention relates in general to a motorcycle apparatus and pertains, more particularly, to improvements in the drive system of the motorcycle relating, by way of example, to the motorcycle transmission, the motorcycle one-way clutch, and the overall drive system for the motorcycle. Even more particularly, the present invention relates to a two wheel motorcycle in which both front and rear wheels are driven and in which the drive system operates on an automatic transmission basis.

Among the many objects of the present invention to be set forth hereinafter in connection with a full description of the invention, is the object of providing an improved drive system for a two wheel drive motorcycle which adapts the motorcycle for extensive use, particularly off-the-road use, especially as in comparison with existing single wheel drive motorcycle.

Another object of the present invention is to provide an improved transmission for a two wheel drive motorcycle which operates in conjunction with a torque converter for providing automatic transmission drive operation.

A further object of the present invention is to provide an improved motorcycle apparatus having an improved one-way clutch, one which has been specifically designed to be of relatively simple construction, effective in use, and requires substantially no maintenance.

Still another object of the present invention is to provide an improved drive system for a motorcycle, particularly a front and rear wheel driven motorcycle, and in which the overall drive system provides for effective automatic transmission operation, yet at the same time selectively enabling a different gear ratio drive by way of the transmission.

SUMMARY OF THE INVENTION

To accomplish the foregoing and other objects and features of the present invention there is provided a motorcycle having a frame, a front wheel, means supporting the front wheel from the frame, a rear wheel, and means supporting the rear wheel from the frame. The motorcycle has a vehicle engine supported in the frame and provided with an output drive shaft. A torque converter is mounted from the engine drive shaft. The output of the torque converter couples to a transmission having an input shaft, an output shaft and a gear selector. The combination of separate torque converter and transmission provide for automatic transmission drive operation in that at idle there is no drive through the torque converter but upon reaching a predetermined RPM the drive couples via the torque converter to the transmission for providing drive from there to both front and rear wheels. In accordance with the invention the gear selector has shift means preferably in the form of a linearly slideable shift knob which moves to separate alternate positions for providing different gear ratio drive at the transmission output shaft. The gear selector preferably has five separate positions, three of which correspond to three different pairs of gears for providing at least three different gear ratios and two other positions which may be referred to as intermediate neutral positions. The gear selector has associate therewith a shaft and shift knob and is adapted to be manually controlled to slide within an associated housing with each of the gears that are to be engaged having slots for receiving the gear selector so as to complete the drive, on a selective basis to an output gear that drives the aforementioned output shaft of the transmission. Means are provided coupling from the transmission output shaft to the rear wheel for providing direct drive to the rear wheel. This means may include a chain and sprocket for providing this direct drive. Means are also provided coupled from the transmission output shaft to the front wheel for enabling drive to the front wheel. This coupling may also include a chain and sprocket arrangement but more importantly comprises a drive shaft and a one-way clutch. The drive shaft preferably has associated therewith a universal joint and beveled gears for providing drive to the front wheel drive chain. The one-way clutch in accordance with the present invention comprises a pair of members secured to the drive shaft and transmission output shaft, respectively, a clutch spring disposed about the said members, and means for interlocking the members but enabling rotation therebetween when it is desired to have the clutch slip. The one-way clutch enable the two wheel drive to be carried out without fear of damage to other parts of the drive system.

BRIEF DESCRIPTION OF THE DRAWINGS

Numerous other objects, features and advantages of the invention should now become apparent upon the reading of the following detailed description taken in conjunction with accompanying drawings, in which:

FIG. 4 is a cross sectional view taken along line 4—4 of FIG. 1 showing further details of the drive system of the invention and furthermore illustrating drive to both the front and rear wheels and the portion of the drive system including the one-way clutch and torque converter;

FIG. 5 is a more detailed cross sectional view taken along line 5—5 of FIG. 4 showing further details of the one-way clutch illustrated in FIG. 4; and FIG. 6 is an exploded perspective view showing the components of the one-way clutch illustrated in FIGS. 4 and 5.

DETAILED DESCRIPTION

Figure 1:
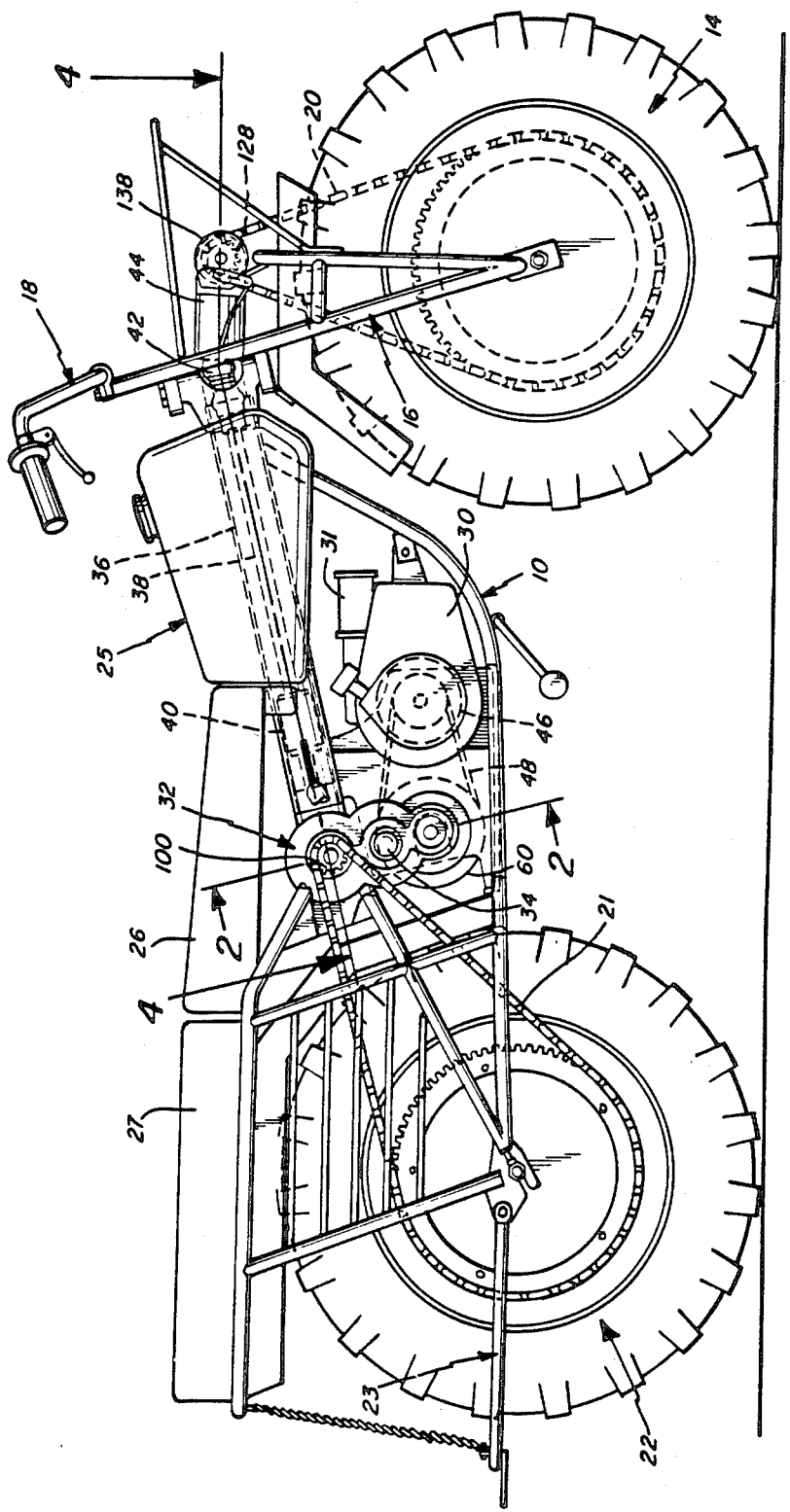
FIG. 1 is a side elevation view of a two wheel drive motorcycle constructed in accordance with the principles of the present invention and depicting the overall drive scheme from the engine to both front and rear wheels.

Referring now to the drawings, there is shown a motorcycle in which many of the parts of the motorcycle are of substantially conventional design and as such are not discussed in great detail herein. The motorcycle of the present invention has both front and rear wheels driven and is adaptable for multiple uses including substantial off-the-road use. The vehicle of this invention is very rugged and may even be used in logging operations, particularly when there is a difficulty of access to certain areas.

The motorcycle has a tubular main frame 10 as depicted in FIG. 1. There is also provided a front wheel 14 supported by a front fork 16. The front wheel 14 is of course rotatably supported at the front of the frame 10 and is steerable by means of the handle bars 18. FIG. 1 illustrates the front wheel drive chain 20 for providing drive to the front wheel 14. Similarly, there is provided a rear wheel drive chain 21 for providing drive to the rear wheel 22. The rear wheel 22 is also suitably rotationaly supported from the frame 10. As illustrated in FIG. 1 there is also provided a frame member 23 that forms a trailer hitch so that a trailer or the like can be supported from the member 23.

FIG. 1 also illustrates at the top of the frame 10 a gas tank 25 and seats 26 and 27 but at the lower end of the frame 10 there is supported the engine 30 with its carburetor 31 supported thereon and the transmission 32. FIG. 1 depicts the shift knob 34 associated with transmission 32. The details of the transmission are described hereinafter in connection with FIG. 2. Basically, the operation of the shift knob 34 sets the transmission into one of three different gear positions and also sets the transmission into neutral (two preferred positions).

Figures 2, 3:
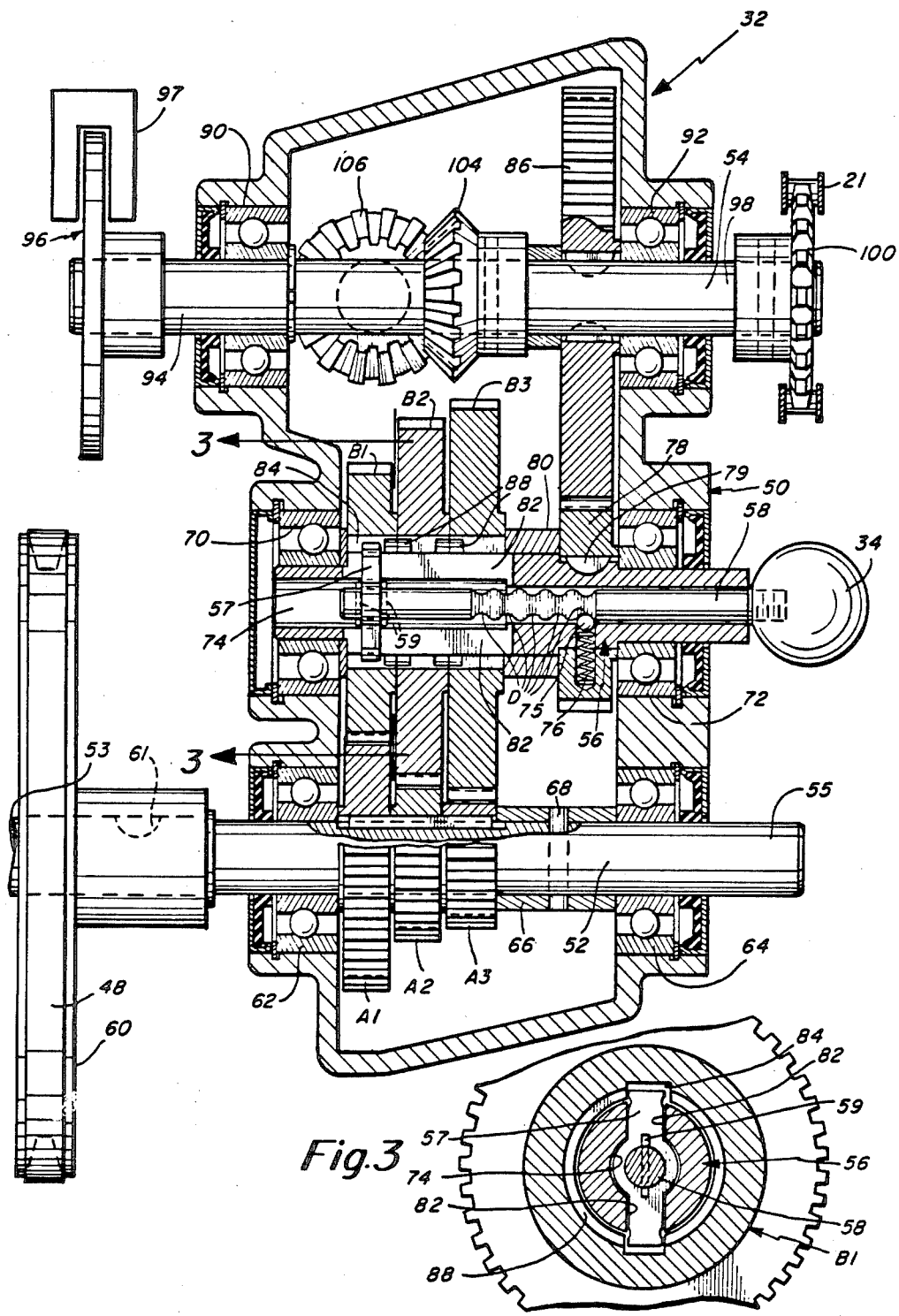
FIG. 2 is a cross sectional view taken along line 2—2 of FIG. 1 showing further details of the transmission of the present invention illustrating the gear selector with its shift knob in one of its three drive positions.
FIG. 3 is a cross sectional view taken along line 3—3 of FIG. 2 showing further details of the gear selector in the engaged position with one of the gears.

Reference is now made to FIGS. 2 and 3 which show the details of the transmission 32 of the present invention. The transmission 32 includes a housing 50 in which is supported a transmission input shaft 52, a transmission output shaft 54, and a gear selector shaft 56. The gear selector shaft 56 carries the gear selector 57 carried on the operating shaft 58 which has the shift knob 34 secured to the opposite end thereof.

As previously mentioned in FIG. 1, the output of the torque converter 46 (also see FIG. 4) couples by way of the belt 48 to the pulley 60. In FIG. 2 the end 53 of the shaft 52 is shown cut off but in actuality the shaft may extend further to the left for the purpose of a power take off. The opposite end 55 of the shaft 52 may also function as a point for a power take off. Thus, the input shaft 52 not only functions as an input drive but also functions as a means for power take-off. FIG. 2 illustrates the key 61 for keying the pulley 60 to the input shaft 52.

The input shaft 52 is supported by bearings at either end in the transmission housing 50. These bearings include a bearing 62 on one side and a bearing 64 on the other side of the housing. The bearings 62 and 64 may be disposed in position in a conventional manner such as with the use of snap rings and may also have associated therewith grease seals so that each of the bearings remain properly lubricated.

Secured to the input shaft 52 are three gears, A1, A2, and A3. Gear A1 is a relatively large gear, gear A2 is an intermediate diameter gear and gear A3 is a small diameter gear. Each of these gears are properly keyed to the input shaft 52 for rotation therewith. Adjacent to the gear A3 there is also provided a spacer 66 which is locked to the input shaft 52 by means of a pin 68. The spacer 66 properly positions the 3 gears A1, A2, and A3 relative to the support bearings 62 and 64.

The gear selector shaft 58 is similarly provided with end bearings for its support. These bearings include a bearing 70 at one end and a bearing 72 at the opposite end. As with the bearings 62 and 64, the bearins 70 and 72 are provided with retaining rings for maintaining them in place and also have associated therewith grease seals so that the grease within the housing 50 is maintained therein and does not leak from the housing during operation of the transmission. Gear selector shaft 58 is provided with a centrally disposed passage 74 for receiving the operating shaft 58 which intercouples between the shift knob 34 and the gear selector 57. The gear selector 57, as noted in FIG. 3 is secured to the operating shaft 58 by means of a roll pins 59.

The operating shaft 58 associated with the gear selector 57 is provided with a series of five detents D. The registering ball 75 with its associated spring 76 is shown in place registering with one of the detents D which is the right-hand mote detent. In this position the shift knob 34 is disposed all the way into the transmission housing.

The gear selector shaft 56 which houses the operating shaft 58 has supported thereabout circular gears B1, B2 and B3. The gears B1, B2, and B3 are engaged with the respective gears A1, A2, and A3 associated with the input shaft 52. Thus, when the input shaft 52 is rotating this causes the gears A1, A2, and A3 to rotate and because these gears are always in engagement with gears B1, B2 and B3 the gears B1, B2 and B3 likewise are in rotation. Also keyed to the gear selector shaft 56 is a small spur gear 78 fastened by key 79 to the gear selector shaft 56. A spacer 80 is provided between the spur gear 78 and the circular gear B3.

The gear selector shaft 56 is provided with diametrically disposed slots 82 that extend the width of the three gears B1, B2 and B3. These diametrically disposed slots 82 permit movement of the gear selector 57 along the length of the gear selector shaft 56 under control of the detent arrangement that is illustrated in FIG. 2. In FIG. 2 the gear selector 57 is shown in engagement with a slot 84 in the gear B1. The other gears B2 and B3 have similar slots. In this regard refer to FIG. 3 and note the gear selector 57 extending into the slot 84 for providing drive from only the gear B1 to the gear selector shaft 56. Although the gears B2 and B3 are rotating, the gear selector 57 only provides engagement with the gear B1. Thus, the gears selector shaft 56 is rotated from the input shaft only by way of the gears A1 and B1. This intercoupling is carried out through the spur gear 78 to an output gear 86 which is keyed to the output shaft 54.

In connection with FIG. 2, the shift knob 34 may also be moved to the right. In the next detent position that is engaged the operating shaft 58 is in a position intermediate gears B1 and B2. The gears B1 and B2 as well as the gears B2 and B3 defined therebetween a further slot 88 which essentially causes disengagement between the gear selector 57 and either of gears B1 and B2. The other slot 88 associated with gears B2 and B3 similarly provides for disengagement. When the shift knob 34 is moved further to the right the gear selector 57 can selectively engage either with gear B2 or when it is all the way to the right with gear B3.

The output shaft 54 is supported at the top of the transmission housing 50. For this purpose there is provided a bearing 90 on one side and a bearing 92 on the opposite side. The output gear 86 is keyed to the shaft 54 adjacent to the bearing 92. The bearings 90 and 92 preferably are retained in place in a conventional manner such as with the use of a retaining ring and preferably have associated therewith a grease seal for preventing leakage of the grease from the housing 50. As indicated in FIG. 2, the left end 94 of the output shaft 54 is provided with a disk brake 96. This is the disk brake associated with the rear wheel. FIG. 2 schematically illustrates a caliper 97 for operating the disk brake.

At the right-hand end 98 of the output shaft 54 there is secured a sprocket 100 which is adapted to carry the drive chain 21.

FIGS. 2 and 4 also illustrate the spur gears 104 and 106 for providing drive from the shaft 54 to shaft 108.

The aforementioned right angle drive unit 44 includes a housing 120 having supported therein a first bevel gear 122 and a second bevel gear 124. The bevel gear 122 is secured to shaft 114. Shaft 114 is supported by ball bearings 115. The bevel gear 124 couples by way of shaft 126 to a chain sprocket 128. The chain sprocket 128 is for driving the front wheel chain 20 illustrated most clearly in FIG. 1. The shaft 126 is supported by means of a ball bearing 130. Associated with the roller bearing there may be a grease seal 132 as illustrated in FIG. 4. The shaft 126 also extends at its opposite end in a ball bearing 136. At this end of the shaft is provided the disc brake 138. The disc brake 138 is associated with the front wheel of the vehicle. A caliber 140 is illustrated associated with the disc 138. Associated with the ball bearing 136 there may be provided a grease seal 144.

The exploded perspective view of FIG. 6 shows all of the components of the improved one-way clutch 40 in accordance with the present invention. The clutch 40 may also be termed, somewhat more descriptively, a wrap spring over-running clutch. The one-way clutch comprises support members 150 and 152, a shouldered pin 154, and tension (torsion) spring 156. FIG. 5 shows all of these components comprisng a one-way clutch in an assembled position. Thus, there is provided a roll pin 160 which is adapted to secure the member 150 to the transmission output shaft 108. A second roll pin 162 is provided for securing the other member 152 to the drive shaft 38. The shouldered pin 154 is used to interlock the members 150 and 152 yet providing a limited rotation therebetween. To provide this interlocking the head 155 of the pin 154 sits in the recess 151 and there is provided a third roll pin 166 passing through a hole in the member 152 for securing the opposite end of the shouldered pin 154. In this regard the pin 154 as well as the shafts 108 and 38 are provided with passages for receiving their respective roll pins. In addition, there are provided a pair of retaining rings 168 and 169 for retaining the ends of the torsion spring 156 in place about the member 151 and 152.

In connection with the operation of this one-way clutch, under normal operating conditions when the clutch does not slip, the drive is direct from the transmission output shaft to the drive shaft 38. However, if for any reason the front and rear wheels rotate differently in relationship to each other then the clutch will slip so that damage does not occur to other parts of the drive system. The slip occurs by means of the shouldered bolt 154 which is capable of rotating in the support member 150.

Having now described a limited number of embodiments of the present invention, it should now be apparent to those skilled in the art that numerous other embodiments and modifications thereof are contemplated as following the scope of the present invention as defined by the appended claims.

What is claimed is:

1. A motorcycle comprising;
a frame,
a front wheel,
means supporting the front wheel from the frame,
a rear wheel,
means supporting the rear wheel from the frame,
a vehicle engine supported in the frame and having an output drive shaft,
a torque converter mounted from said engine drive shaft,
a transmission having an input shaft, an output shaft and a gear selector,
means coupling the output of the torque converter to the input shaft of the transmission,
said transmission having multiple engageable gears controlled by said gear selector,
said gear selector having shift means moveable to separate alternate position for providing different gear ratio drive at the transmission output shaft,
means coupled from said transmission output shaft to the rear wheel for providing direct drive to the rear wheel,
means coupled from said transmission output shaft to the front wheel for enabling drive to the front wheel,
said means for enabling drive to the front wheel comprising a drive shaft and a one-way clutch means,
said one-way clutch means comprises a pair of members secured to the drive shaft and transmission output shaft, respectively, a clutch spring disposed about the member and means for interlocking the members enabling rotation therebetween,
said means coupling the output of the torque converter to the input shaft of the transmission comprises a pulley means and a belt intercoupling a pulley associated with the torque converter and a pulley associated with the transmission,
said input shaft supports a first set of gears and further including a gear selector shaft for supporting a second set of gears,
said gear selector shaft has a passage for receiving an operating shaft having the gear selector at one end thereof and having the shift means at the other end thereof,
said operating shaft has a series of detents adapted to register the gear selector at different positions relative to the gear selector shaft,
said gear selector is engageable with only one gear associated with the gear selector shaft at the time,
gears associated with said gear selector shaft have slot means for receiving said gear selector,
said transmission output shaft as direct sprocket chain-drive to the front wheel,
said one-way clutch means comprises a one-way clutch including a pair of members one secured to the drive shaft and the other to the transmission output shaft, a clutch spring disposed about said members and a shoulder pin means for interlocking the members but enabling rotation therebetween, and
means securing one member of the one-way clutch to the transmission output shaft.

2. A motorcycle as set forth in claim 1 including means securing the other member of the one-way clutch to the drive shaft,
said shoulder pin means has a head received in a shoulder of one of the members and is pinned to the other member,
a torque tube disposed over the drive shaft and the one-way clutch and having associated with bearing means for supporting of the drive shaft,
a double U-joint at the end of the drive shaft, and
said means enabling drive to the front wheel also comprises a right angle drive unit having gear means for providing sprocket-chain drive to the front wheel.

* * * * *